Dec. 29, 1925.
F. J. HALLER ET AL
1,567,842
PULLEY
Filed August 4, 1924
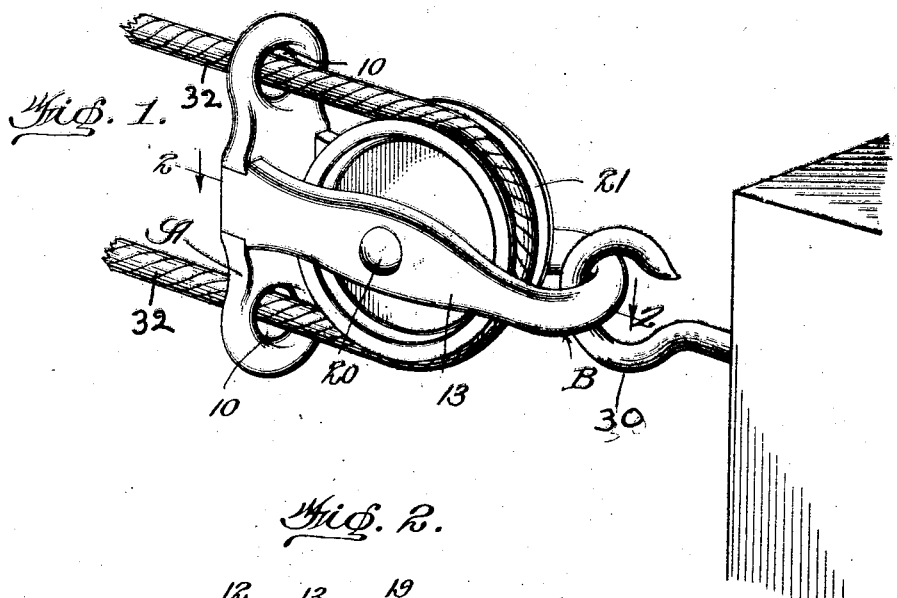
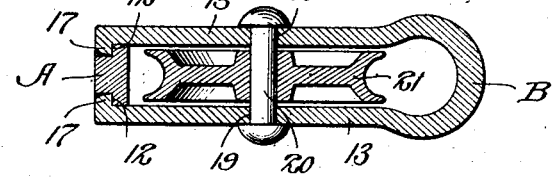
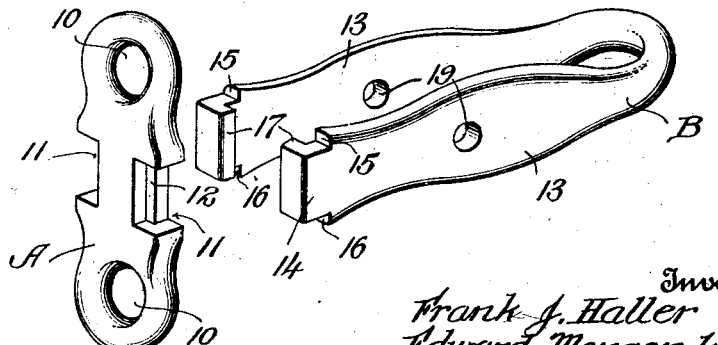
Inventor
Frank J. Haller
Edward Mensenkamp
By Cheever & Cox
Attorney Patented Dec. 29, 1925.

1,567,842

UNITED STATES PATENT OFFICE.

FRANK J. HALLER AND EDWARD MENSENKAMP, OF FREEPORT, ILLINOIS, ASSIGNORS TO STOVER MANUFACTURING & ENGINE CO., OF FREEPORT, ILLINOIS, A CORPORATION OF ILLINOIS.

PULLEY.

Application filed August 4, 1924. Serial No. 730,042.

*To all whom it may concern:*

Be it known that we, FRANK J. HALLER and EDWARD MENSENKAMP, citizens of the United States, residing, respectively, at Freeport, in the county of Stephenson and State of Illinois, have invented a certain new and useful Improvement in Pulleys, of which the following is a specification.

This invention relates to a pulley supporting structure and is especially adapted for use in connection with clothes line pulleys, but is in no way limited to such use.

It is the purpose of the invention to provide such a structure embodying a minimum number of elements capable of assembly without the employment of separate fastening devices whereby material advantages in economy of manufacture and assembly are attained.

To this end we resort to the simple expedient of forming the structure of a base plate, specifically a rope guide, and a U-shape member which are respectively provided with formations maintained in inter-engagement by the inherent resiliency of the arms of the U member, securing it to the rope guide.

In the drawings, in which similar numerals represent the same parts throughout the several views:

Figure 1 is a perspective view of the device of this invention, as it may be used.

Figure 2, a section on the line 2—2 of Figure 1; and

Figure 3, a perspective view showing the rope guide and U-shaped member of the structure separated.

In the drawings, the invention is shown as comprising a rope guide A and U-shaped member B. Said rope guide A is provided adjacent each end with a rope guide opening 10. On opposite sides of the rope guide are provided corresponding recesses 11 and each of these recesses has one portion of greater depth than the remaining portion to provide a shoulder 12.

Member B should be made of material having sufficient resilience for the purposes of this invention and is shown as embodying arms 13, reduced at their outer ends, as at 14, to provide shoulders 15 and 16, and at the free end an inwardly directed flange 17.

In assembling the device, the rope guide A and member B, the arms 13 of the latter are by any suitable means spread apart against their resiliency and when said arms are so spread apart, the member B will snap over member A. With this status existing, the members A and B are moved relatively to position, the arms 13 in embracing relation to the rope guide with the reduced portions 14 opposite respective recesses 11. The arms 13 will operate under their resiliency to seat the reduced portions 14 in respective recesses 11 with the flanges 17 engaged behind respective shoulders 12 and the shoulders 15 and 16 abutting against the adjacent face of the rope guide, thus effecting the assembly of the structure.

The arms 13 are provided with aligned openings 19 through which the journal pin or rivet 20 of a pulley 21 is engaged to thereby associate such pulley with the structure, all as clearly shown in Figures 1 and 2.

In use, the member B is attached to any hook 30 or the like, and a rope 32 or the like is passed through openings 10 and over pulley 21.

What we claim as new and desire to secure by Letters Patent is:

A pulley supporting structure comprising a rope guide, a U-shaped member, and formations on the rope guide and arms of the member maintained in inter-engagement by the inherent resiliency of the arms to secure the rope guide and member in assembly, said formations embodying reduced free ends on the arms of the member engageable, respectively, in corresponding recesses in opposite sides of the rope guide, and providing shoulders on the arms for abutment against the face of the rope guide which is positioned adjacent the member, said recesses each having one portion of greater depth than the remaining portion to provide a shoulder, and inwardly directed flanges on the reduced free ends of the arms engageable behind respective shoulders within the recesses of the rope guide.

In witness whereof, we have hereunto subscribed our names.

FRANK J. HALLER.
EDWARD MENSENKAMP.